Jan. 25, 1938.   C. DREYFUS ET AL   2,106,296
FILM AND SHEET OF ORGANIC DERIVATIVES OF CELLULOSE
Filed April 5, 1934
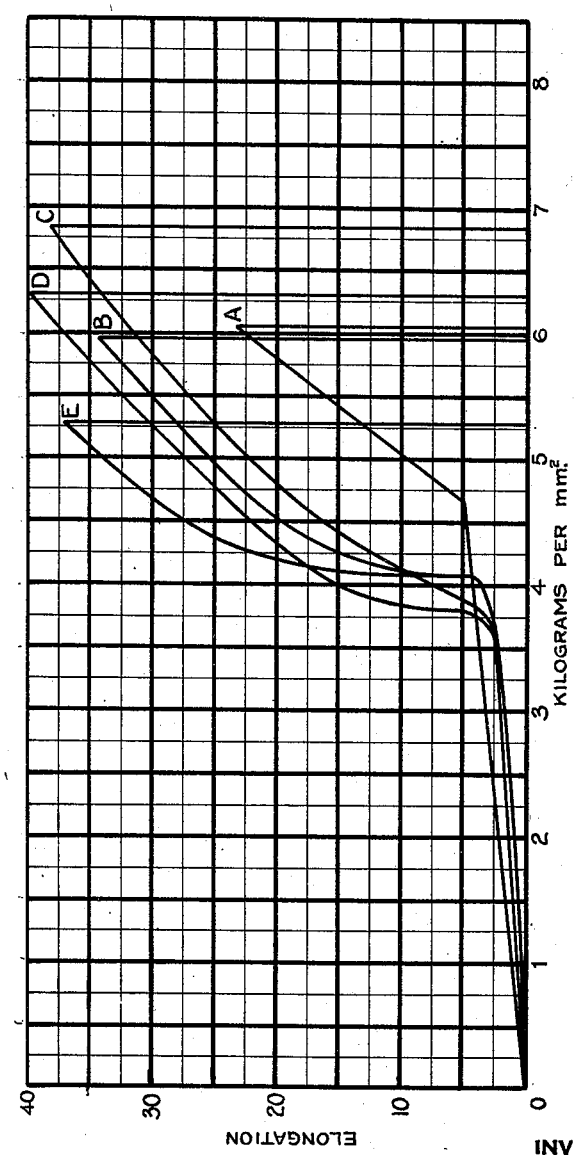
INVENTOR
CAMILLE DREYFUS AND
GEORGE SCHNEIDER
BY
ATTORNEY Patented Jan. 25, 1938

2,106,296

UNITED STATES PATENT OFFICE 2,106,296

FILM AND SHEET OF ORGANIC DERIVATIVES OF CELLULOSE

Camille Dreyfus, New York, N. Y., and George Schneider, Montclair, N. J., assignors to Celanese Corporation of America, a corporation of Delaware Application April 5, 1934, Serial No. 719,138

4 Claims. (Cl. 106—40)

This invention relates to the formation of filaments, films, foils, sheets, etc., from organic derivatives of cellulose and more particularly to the treatment and preparation of the organic derivatives of cellulose to produce films, etc., of increased toughness.

An object of the invention is the economic and expeditious production of tough foils, sheets, films, filaments, articles, etc., from organic derivatives of cellulose. Another object of the invention is the production of foils or films of organic derivatives of cellulose wherein one or more of the factors of plasticizer, solvent, processing and nature of derivative of cellulose employed are so controlled as to impart greater strength to the materials produced. Other objects of the invention will appear from the following detailed description and drawing.

In the drawing is shown a graph of the curve of toughness of four thin foils prepared according to this invention and one foil prepared according to a prior general formula.

By employing this invention thin foils, films or filaments of organic derivatives of cellulose are produced that are tough, as distinguished from high tensile strength and great pliability. Thus, a film may have a high tensile strength and yet be brittle and further a film may have a high elongation, that is, it may be stretched to a great extent before breaking, or it may be very flexible such that it may be flexed back and forth at the same point many times without tiring and breaking, yet it may have a small tensile strength. However, a film is considered tough when it has a relatively large tensile strength and a relatively high elongation or extensibility at the same time. The toughness of a film is therefore best expressed in terms of units of work, that is ergs, required to cause a breaking of the film.

A very convenient way of deriving the number of ergs or other units of work required to break a film is to graph a stress-strain curve of the sample, and calculate the area beneath the curve as the work $\Delta X$. These graphs are formed with the tensile strength in kilograms per square millimeter as abscissa and the elongation in millimeters, or on a percentage basis in relation to a selected sample, as ordinates.

For certain commercial purposes an exceedingly tough foil, film or sheet is required which at the same time is colorless, transparent and not affected by ageing. By prior methods foils have been made that have a toughness of from $1 \times 10^7$ to $3.0 \times 10^7$ ergs per square mm. of cross section per meter of length. By this invention foils or films may be made having a toughness of from $3.2 \times 10^7$ to $8.1 \times 10^7$ ergs per sq. mm. per m. or an improvement in toughness of from 100 to 242% of the toughness of the toughest foils or films heretofore made.

According to this invention the percentage and types of plasticizer, solvent and the acyl value of organic esters of cellulose employed are selected to produce tough films of a toughness greater than $3.2 \times 10^7$ ergs per sq. mm. per m. We have found that by incorporating in organic esters of cellulose, while the same are dissolved in a suitable solvent, a sufficient quantity of a modifying substance comprising one or a mixture of glycerine, glycol and derivatives thereof that the toughness of the foils, films, filaments and sheets formed from such a solution is greatly increased and may be made to exceed $3.2 \times 10^7$ ergs per sq. mm. per m. We have also found that the toughness of films may be increased by selecting cellulose derivatives having particular acyl values and employing such cellulose derivatives with compounds of the polyhydric alcohol type in the presence of a monohydric alcohol.

This invention is applicable to the organic esters of cellulose, for example, cellulose acetate, cellulose formate, cellulose propionate and cellulose butyrate. The invention, as to types and quantity of polyhydric alcohol compound and solvent employed is also applicable to the ethers of cellulose and the mixed esters and/or ethers of cellulose. Examples of ethers of cellulose are methyl cellulose, ethyl cellulose and benzyl cellulose. The invention may be employed in forming filaments, foils or films from solutions of a mixture of the various esters of cellulose or ethers of cellulose.

The modifying agent employed may be one or a mixture of polyhydric alcohols or their derivatives such as esters and ethers of the glycols and glycerols. Examples of the polyhydric alcohols are glycerol, diglycerol, ethylene glycol, diethylene glcyol and triethylene glycol. Examples of the ethers are the mono-ethyl ethers, the dimethyl and di-ethyl ethers, the butyl ethers and methyl ethyl ether of the polyhydric alcohols. Examples of the esters are the acetins, the acetyl esters of di-glycerol and the acetyl esters of ethylene and diethylene glycol. Other like derivatives may be employed.

These modifying agents may be used in suitable amounts, namely from 20 to 60 percent based upon the weight of the cellulose derivative material. Certain of the plasticizers, however, such as glycerine cannot be incorporated in the plastic material in amounts much greater than 30% without tending to make the product opaque. A mixture of twenty parts of glycerine and 40 parts of formal glycerol, diethylene glycol or the like may, however, be used in quantities as high as 60% without affecting the transparency of the products. We have found that from 30 to 60% of modifying agent may be used to produce the best results.

For producing the toughest products the modifying agent should be selected such that it is compatible with the solvent used to form the solution of the cellulose derivative base material. The preferred solvents are those that contain a monohydric alcohol. Examples of such solvents are mixtures of acetone and methyl alcohol, mixtures of acetone and ethyl alcohol, mixtures of acetone, water and methyl or ethyl alcohol, mixtures of ethylene dichloride and ethyl or methyl alcohol and like solvent mixtures containing alcohol. Although solvents containing alcohols are preferred, other solvents that will give tough films may be employed, for example, acetone, mixtures of acetone and water, chloroform, ethylene dichloride and similar solvents.

We have found in forming foils or films of organic esters of cellulose that the toughness of the product is inversely proportional to the acyl value of the ester within certain limits, all other factors remaining contant. Thus, a film in which cellulose acetate of 49 acetyl value (determined as acetic acid) was employed as the base material is tougher than a similar film containing cellulose acetate of 54 acetyl value. This phenomenon is true for cellulose acetate having acetyl values between 40 and 50 and is correspondingly true for the other organic esters of cellulose.

Where desired, plasticizers may be incorporated in the product. These plasticizers preferably should be compatible with the polyhydric alcohol compound. Examples of such compatible plasticizers in the case of glycerine are triacetin and diacetin. Compatible high boiling solvents such as formal glycerol may also be employed in making the solution.

This invention is of particular importance in the making of foil, that is, material having a thickness of 0.0005 to 0.002 inch, which because of its toughness is eminently suited for use in wrapping foodstuffs, tobacco products, garments and for all other purposes to which transparent wrapping material may be put. If desired, the foil may be coated with a moisture-proof coating formed from coating compositions containing cellulose nitrate or other derivative of cellulose and a resin, which composition may or may not contain wax.

In addition to foils, other articles such as films, filaments or yarns, as well as sheets, plastic masses, molding powders or compositions may be made in accordance with this invention.

For the purpose of further describing the invention, with respect to types and quantity of plasticizers and solvent to be used, the following table is given:

| Ingredients | B | C | D | E | F |
|---|---|---|---|---|---|
| Cellulose acetate "49" | 100 | 100 | 100 | 100 | |
| Cellulose acetate "54" | | | | | 100 |
| Glycerine | 10 | 10 | 15 | | 15 |
| Diethylene glycol | 30 | 30 | 30 | 30 | 30 |
| Formal glycerol | | | | 20 | |
| Water | | 10 | | | |
| Acetone/alcohol | Q. S. | Q. S. | Q. S. | | Q. S. |
| Acetone/water | | | | Q. S. | |
| Toughness of resulting foil | $5.11 \times 10^7$ | $7.61 \times 10^7$ | $7.27 \times 10^7$ | $3.93 \times 10^7$ | $4.1 \times 10^7$ |

In the above table "49" and "54" stand for the approximate acetyl value of the cellulose acetate. The figures of proportions are by weight. The expression Q. S. stands for sufficient quantity. The mixture of acetone-alcohol may be formed using various proportions of the ingredients. Thus, 90 parts of acetone may be mixed with 10 parts of ethyl or methyl alcohol or a constant boiling mixture may be used of approximately 85 parts acetone and 15 parts ethyl or methyl alcohol. The amount of water in the acetone-water solvent may vary from 3 to 25 parts water to 100 parts of acetone.

In the table below is given, as illustrative, the work that the material formed according to the above table takes up before it breaks, the work being represented by the area under the curves on the accompanying drawing. The work or toughness is given both on a percentage basis in relation to a sample made by former methods "A", the latter being given an arbitrary rating of 100, and in absolute figures in kg. per cm.$^2$ per m. as well as in ergs per sq. mm. per m.

| Sample | A | B | C | D | E |
|---|---|---|---|---|---|
| Area under curve | 12.80 | 20.82 | 31 | 29.6 | 16 |
| Kgm./cm.$^2$/m | 32 | 52.1 | 77.5 | 74 | 40 |
| Ergs/mm.$^2$/m | $3.14 \times 10^7$ | $5.11 \times 10^7$ | $7.6 \times 10^7$ | $7.27 \times 10^7$ | $3.92 \times 10^7$ |
| Percent of material A | 100 | 163 | 242 | 231 | 125 |

In the above table the toughness is expressed in units of work, ergs per sq. mm. per m., required in stretching a test piece of the material 1 meter long and 1 sq. millimeter in cross section before it breaks.

In the drawing the curve A represents the curve of toughness of a cellulose acetate plastic made by ordinary methods and using a plasticizer other than a polyhydric alcohol. The curves B, C, D and E represent the curves of toughness of cellulose acetate films made according to this invention and referred to in the above tables. In the drawing the elongation is expressed in centimeters. Therefore, in calculating from the graph the degree of toughness of a composition, the following procedure may be followed:

1 kilogram = $1000 \times 980.6$ dynes = 980,600 dynes or $9.806 \times 10^5$ dynes.

1 kilogram per meter = $9.806 \times 10^7$ ergs.

.5 kilogram $\times$ .05 = .025 kilogram per meter or each heavily outlined square on the graph = .025 kilogram per meter.

For example curve C will be calculated. It is found by counting the heavily outlined squares under the curve C that there are 31 squares therefore $31 \times .025 = .775$ kilogram per meter represented by the area under curve C. This is reduced to units of work thus $.775 \times 9.806 \times 10^7 = 7.60 \times 10^7$ or the number of ergs per square millimeter per meter or the number of units of work to break the film represented by the curve C.

It is to be understood that the foregoing detailed description and drawing are merely given by way of illustration and many alterations may be made therein without departing from the spirit of our invention.

Having described our invention what we desire to secure by Letters Patent is:

1. A composition of matter comprising an organic acid ester of cellulose of low acyl value and a mixture of diethylene glycol and glycerine in such relative proportions as to form a transparent film or foil of large tensile strength and high elongation dissolved in a compatible volatile solvent.

2. A composition of matter comprising cellulose acetate of low acetyl value and a mixture of diethylene glycol and glycerine in such relative proportions as to form a transparent film or foil of large tensile strength and high elongation dissolved in a compatible volatile solvent.

3. A composition of matter comprising cellulose acetate of 49% acetyl value (determined as acetic acid) and a mixture of diethylene glycol and glycerine in such relative proportions as to form a transparent film or foil of large tensile strength and high elongation dissolved in a compatible volatile solvent.

4. A composition of matter comprising 100 parts of cellulose acetate of 49% acetyl value (determined as acetic acid), 30 parts of diethylene glycol and sufficient glycerine to form a transparent film or foil of large tensile strength and high elongation dissolved in a compatible volatile solvent.

CAMILLE DREYFUS.
GEORGE SCHNEIDER.